United States Patent [19]

Damson et al.

[11] Patent Number: 4,503,505
[45] Date of Patent: Mar. 5, 1985

[54] METHOD FOR RECOGNIZING IRREGULAR COMBUSTION PROCESSES IN AN INTERNAL COMBUSTION ENGINE AND APPARATUS FOR PERFORMING THE METHOD

[75] Inventors: Eckard Damson, Stuttgart; Horst Franke, Löchgau; Ferdinand Grob, Besigheim; Winfried Moser, Markgröningen; Klaus Müller, Tamm, all of Fed. Rep. of Germany

[73] Assignee: Robert Bosch GmbH, Stuttgart, Fed. Rep. of Germany

[21] Appl. No.: 348,043

[22] PCT Filed: Aug. 11, 1981

[86] PCT No.: PCT/EP81/00117
  § 371 Date: Feb. 3, 1982
  § 102(e) Date: Feb. 3, 1982

[87] PCT Pub. No.: WO82/02947
  PCT Pub. Date: Sep. 2, 1982

[30] Foreign Application Priority Data

Feb. 19, 1981 [DE] Fed. Rep. of Germany ....... 3106107

[51] Int. Cl.³ .................. F02B 3/04; G01L 23/22; G06F 15/20
[52] U.S. Cl. ................ 364/431.08; 364/551; 73/117.3
[58] Field of Search ............ 364/551, 431.08, 728; 73/116, 117.3

[56] References Cited

U.S. PATENT DOCUMENTS

| | | |
|---|---|---|
| 3,540,262 | 11/1970 | Wostl et al. |
| 3,735,347 | 5/1973 | Whitney et al. |
| 4,104,990 | 8/1978 | Frobenius |
| 4,193,117 | 3/1980 | Marckwardt ............ 364/728 |
| 4,271,469 | 6/1981 | Kawai et al. |
| 4,292,672 | 9/1981 | Southgate ............ 364/728 X |
| 4,334,422 | 6/1982 | Kawai et al. ........ 364/431.08 X |
| 4,375,668 | 3/1983 | Leung et al. ........ 364/431.08 |

FOREIGN PATENT DOCUMENTS

| | | |
|---|---|---|
| 2605335 | 8/1977 | Fed. Rep. of Germany |
| 2625971 | 12/1977 | Fed. Rep. of Germany |
| 2846795 | 5/1980 | Fed. Rep. of Germany |

Primary Examiner—Edward J. Wise
Attorney, Agent, or Firm—Frishauf, Holtz, Goodman & Woodward

[57] ABSTRACT

A parameter characterizing the course of combustion is ascertained by means of a sensor, preferably an optical sensor. In order to distinguish irregular combustion processes from regular ones, the filtered signal is examined as to its symmetry relative to an imaginary axis of symmetry in the signal maximum. If it is thereby determined that the signal is not symmetrical with respect to this axis, then a recognition signal for irregular combustion is emitted. In order to perform this method, a symmetry pulse is generated, which marks the temporal appearance of the signal maximum. In accordance with this pulse, a characteristic variable is generated which characterizes the course of the signal before the signal maximum and another characteristic variable is generated which characterizes the course of the signal after the signal maximum, and these characteristic variables are then compared with one another.

25 Claims, 14 Drawing Figures

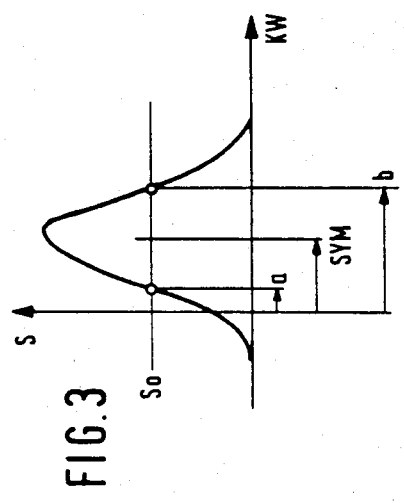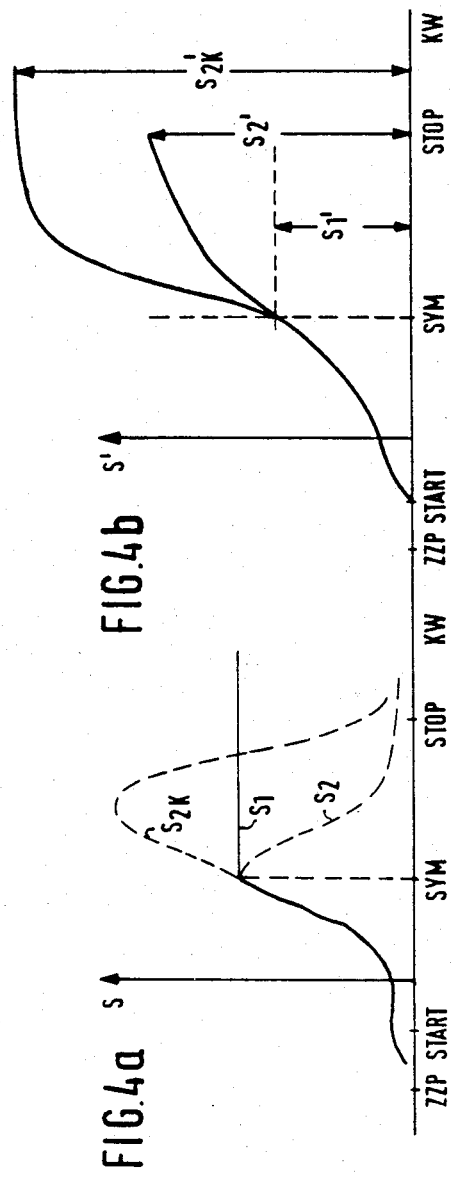

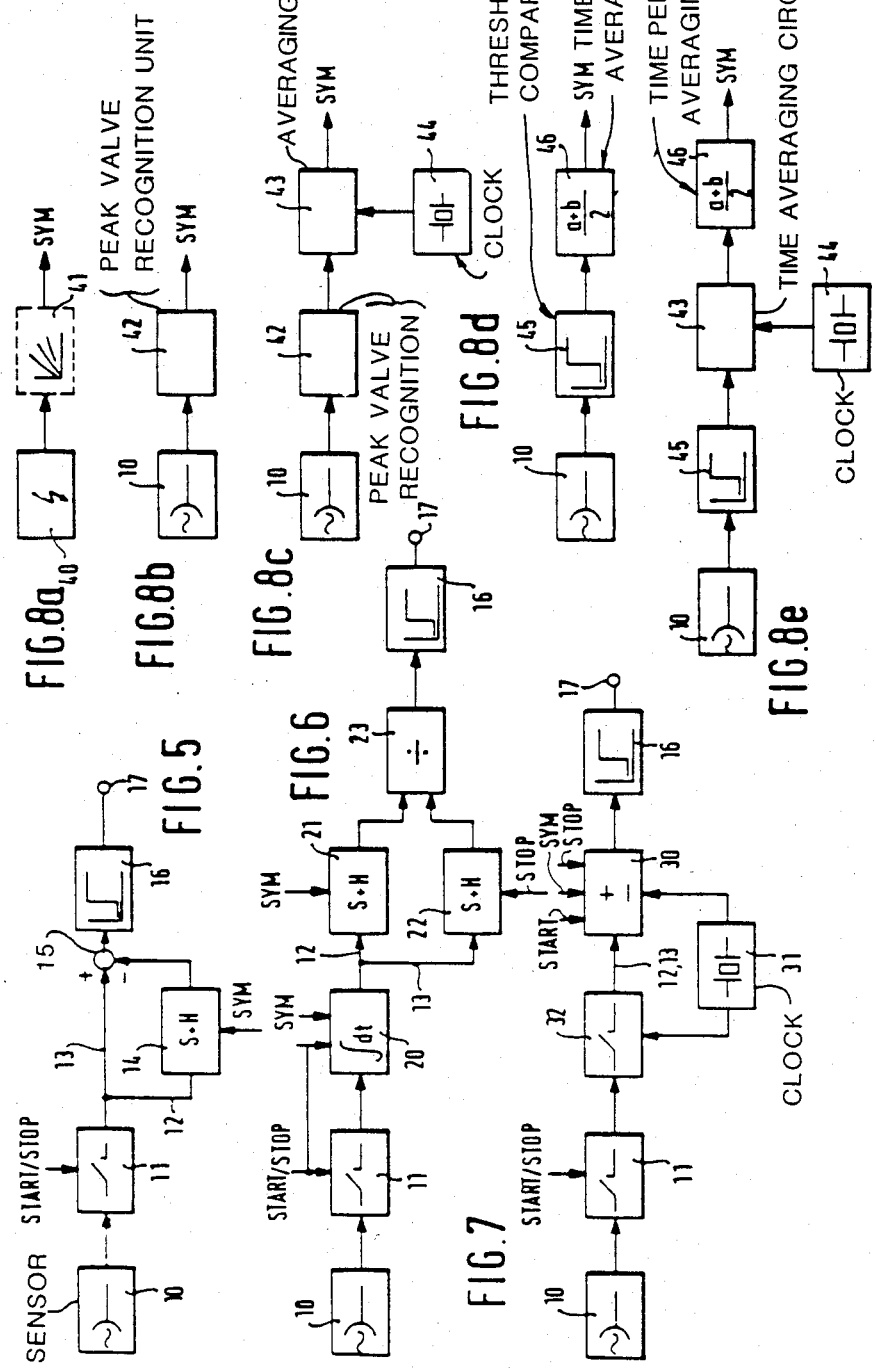

METHOD FOR RECOGNIZING IRREGULAR COMBUSTION PROCESSES IN AN INTERNAL COMBUSTION ENGINE AND APPARATUS FOR PERFORMING THE METHOD

STATE OF THE ART

The present invention relates to a method and apparatus to recognize irregular combustion processes in an internal combustion engine (ICE), for example operation of the engine under knocking conditions; and more particularly to method and apparatus to distinguish knocking signals from other signals which are derived from a sensor providing combustion-related output signals so that knocking can be reliably detected in spite of the presence of, possibly, noise or disturbance signals from the sensor.

BACKGROUND

It is known to measure the combustion processes taking place in the combustion chamber of an internal combustion engine from various standpoints by ascertaining various physical parameters. Among these, for instance, is ascertaining the course of the combustion process over time and through space; ascertaining the instant fuel of injection; ascertaining fuel injection processes; and measuring irregular combustion processes.

Among these irregular combustion processes is "knocking", which occurs in internal combustion engines under certain operating conditions. Knocking, as usually understood, is caused by oscillations within the audible frequency band of the compressed fuel-air mixture, which are triggered by a shock wave. During such oscillations, the transmission of heat to the piston walls and cylinder walls of the engine is substantially increased. A thermal overload of these surfaces is the result, so that knocking must be avoided. On the other hand, it is desirable to utilize the available working range of the engine to the fullest possible extent; it is thus necessary to provide means which will reliably indicate incipient knocking, so that it is then possible to realize a means of engine control in which the engine is always operated just below the knocking limit.

In addition to the problem of furnishing transducers suitable for ascertaining knocking, there is also the measurement problem of being able to recognize the knocking signal reliably and without interference on the basis of the engine oscillations ascertained by the transducer, so that the engine can be appropriately regulated in accordance with a "yes" or "no" signal for knocking recognition.

A knocking detector for this purpose is described in U.S. Pat. No. 3,540,262, where the measured knocking signal is compared with a predetermined threshold signal which is independent of the engine signal; if the threshold is exceeded, a knocking recognition signal is emitted. This apparatus has the disadvantage, however, that only a comparison with an external signal independent of the engine is performed; there is no recognition of knocking with respect to background engine noises.

U.S. Pat. No. 4,012,042 furthermore describes a knocking detector in which the measured knocking signal is compared with a reference signal, which is generated via a function generator in accordance with engine speed. This procedure has the disadvantage, however, that again the actual background noise of the engine is not taken into consideration, but instead is only simulated via a function generator. In particular, no attention is paid to the mode of operation at the time, the engine setting, or the aging of the engine.

Finally, a method for ascertaining engine knocking is known from German Patent Disclosure Document No. 29 16 591 to which U.S. Pat. No. 4,271,469 Kawaii et al, corresponds, in which the peak value of the knocking signal is monitored and compared with the peak values preceding it which have been ascertained for preceding combustion cycles. Among other provisions, measurement is performed only during the existence of a measuring or strobing window, that is, within an interval of time which has been correlated with a specific angular range for crankshaft rotation.

However, the apparatus and methods discussed above have the disadvantage that disturbance noises not related to knocking are not always filtered out reliably, so that measurement results are adulterated. This applies particularly to the noise signals occurring during so-called piston tipping, the amplitude of which can cause a substantial overlap with the knocking signals.

THE INVENTION

It is an object to provide a method and apparatus to reliably distinguish between signals representative of unusual or knocking-type combustion conditions and combustion conditions which are normal, in spite of disturbance and noise signals which may be superimposed on all signals derived from a combustion condition sensor.

Briefly, the wave form of a combustion related signal derived from a sensor is analyzed to determine if the wave form is symmetrical with respect to a maximum value; if it is, a normal or non-knocking type of combustion event has occurred within the combustion chamber of the internal combustion engine (ICE); if the wave form, however, is non-symmetrical, an irregular combustion has occurred.

The method and system has the advantage that irregular conbustion, for example knocking recognition, is available based on wave shape, rather than on parameters which may vary. Knocking recognition, thus, is no longer based on either a fixed or predetermined external parameter such as a switching threshold level or the like. Instead, the shape of the signal itself, filtered through a high-pass filter, is examined in order to recognize irregular combustion processes, and distinguish such irregular combustion processes from regular combustion processes which may have noise signals superimposed on the output signals from the sensor.

In an advantageous embodiment of the invention, a symmetry pulse (SYM) corresponding to the time of appearance of the signal maximum, upon normal combustion, is formed, and characteristic values for the course of the signal before or after this pulse are formed; these characteristic values are then compared with one another after each combustion cycle. It is particularly advantageous to obtain these characteristic values by integration of the signal course before or after the symmetry pulse SYM, because then the recognition of irregular combustion processes can be accomplished by forming quotients of the integrals. In forming these quotients, it is not important what the absolute amounts of the characteristic values are, so that symptoms of aging, such as obscuring of the window when the signal is ascertained by means of an optical sensor, do not impair the result of measurement.

In a further preferred embodiment of the invention, the measurement of the signal is performed only during a measuring or strobing window, that is, a range of the crankshaft angle which is of limited duration, in order to cancel out interference caused by ignition or the like. The determination of this measuring window assures that the measurement procedure is terminated at a specific instant, so that interference factors, such as afterburning, do not adulterate the measurement result.

In order to adapt the measurement method or the measurement apparatus to various operating states of the engine, a further preferred form of embodiment of the invention provides that the ascertained axis of symmetry of the measured signal is shifted by a correction value in accordance with the operating point of the engine at that time.

DRAWING

Exemplary embodiments of the invention are shown in the drawing and will be explained in greater detail in the following description.

FIG. 3 shows a schematic illustration of a signal course for explaining switching thresholds;

FIG. 4a shows the courses over time of measurement signals which have been processed further, in accordance with a first form of embodiment of the method according to the invention;

FIG. 4b shows the courses over time of measurement signals which have been processed further, in accordance with a further form of embodiment of the method according to the invention;

FIG. 5 is the block circuit diagram for a first form of embodiment of an apparatus according to the invention for performing the method according to the invention;

FIG. 6 is the block circuit diagram for a second form of embodiment of an apparatus according to the invention for performing the method according to the invention;

FIG. 7 is the block circuit diagram for a third form of embodiment of an apparatus according to the invention for performing the method according to the invention; and FIGS. 8a–8e are block circuit diagrams for various forms of embodiment of time control means, for use in one of the apparatuses shown in FIGS. 5–7.

DESCRIPTION OF THE PREFERRED EMBODIMENTS

Figure 1:
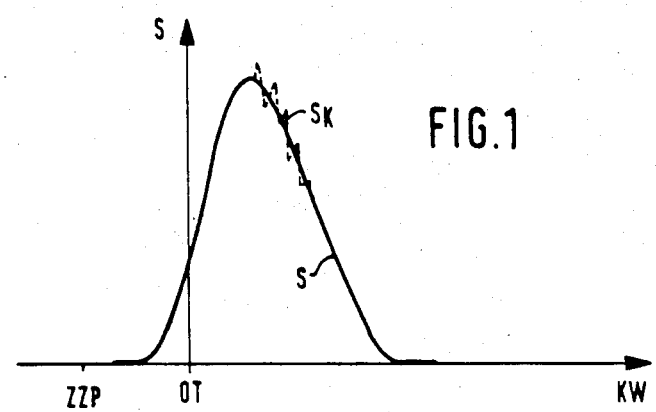
FIG. 1 shows a signal course which is typical for a combustion process of an internal combustion engine, in the event of normal combustion and in the event of knocking.

In FIG. 1, a signal S (ordinate) is plotted over the crankshaft angle KW, this signal S being typical for a combustion process in an internal combustion engine. A signal of this kind may be, for instance, a light signal, a temperature signal, or a pressure signal; the present invention can be based on various physical parameters.

As may be seen from FIG. 1, the course of the signal begins before the top dead center position OT of the cylinder, and as a rule it takes the approximate form of a bell-shaped curve. On the crankshaft angle axis, the instant of ignition is also entered as ZZP. The course of a signal for knocking combustion, $S_K$, is also plotted in FIG. 1. It is apparent that this knocking combustion takes place after the signal maximum has been exceeded.

Figure 2A:
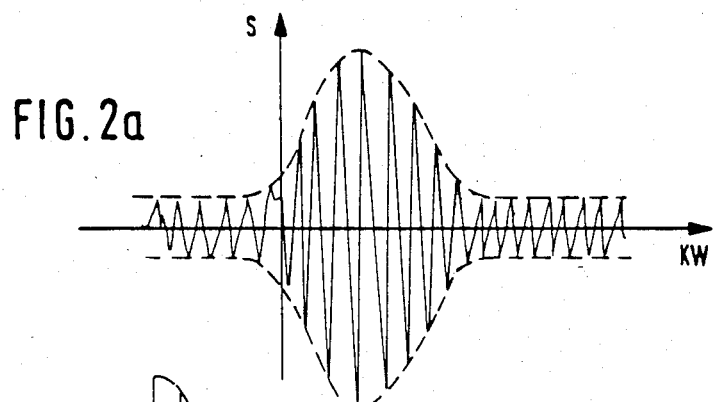
FIG. 2a shows a measurement signal at normal combustion, derived from the signal course shown in FIG. 1.
Figure 2B:
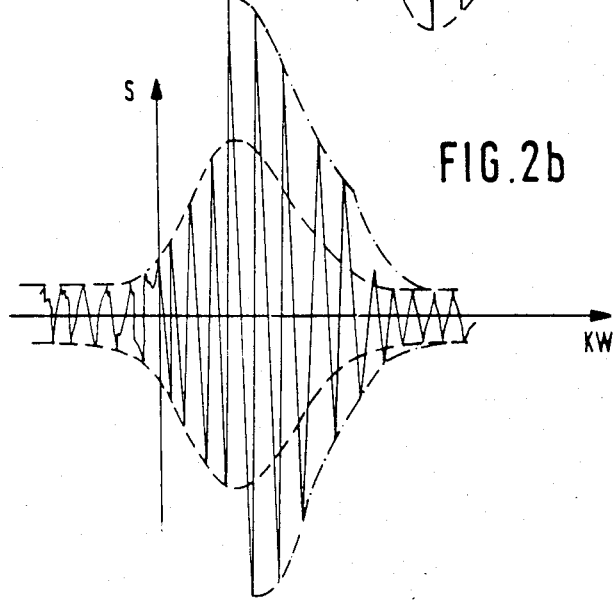
FIG. 2b shows a measurement signal for irregular combustion, derived from the signal course shown in FIG. 1.

In FIG. 2a, a signal S such as is obtained in a conventional high-pass filter is plotted. The signal S is perceived as an envelope curve of an amplitude-modulated disturbance signal. While FIG. 2a illustrates the measurement signal for regular combustion, FIG. 2b additionally shows the course in the event of knocking. Now if one imagines an axis of symmetry passing through the signal maximum in FIGS. 2a and 2b, it becomes quite apparent that the signal course for knocking combustion, as shown in FIG. 2b, is unsymmetrical with respect to this axis of symmetry.

In accordance with the invention, criterion for whether irregular combustion is occurring or not is accordingly obtained by means of examining the symmetry of the signal with respect to the axis passing through the signal maximum.

In accordance with a feature of the invention, and in order to mark the axis of symmetry, a symmetry pulse SYM (FIG. 3) is formed. This symmetry pulse is formed in a simple manner in one form of embodiment of the invention by shifting the ignition signal ZZP or the top dead center signal OT by a predetermined amount. In a further form of embodiment of the invention, the SYM pulse is ascertained from the actual signal maximum, either during one combustion cycle or by forming an average value over the course of several combustion cycles. Finally, it is possible to examine the signal S as to whether it exceeds or drops below a threshold value $S_o$, as is shown in FIG. 3. It is clearly shown that the SYM pulse can be obtained by forming the arithmetic average value of the points associated with exceeding, or dropping below, the threshold $S_o$. This method has the advantage that the ascertainment of the signal maximum is independent of the signal amplitude.

In FIG. 4a, a first method for forming a recognition signal is illustrated. According to this method, a measurement of the signal course shown in FIG. 2a or FIG. 2b is made within a measuring window defined by a starting pulse START and a stopping pulse STOP. The instantaneous value of the signal $S_1$ at the signal maximum, that is, at the instant the SYM pulse appears, is retained. The signal $S_1$ then characterizes the course of the signal prior to the signal maximum. In the event of regular combustion, a signal course $S_2$ follows, while in the event of irregular combustion a signal $S_{2k}$ appears. By comparison of these variables $S_2$ or $S_{2k}$, characterizing the second part of the signal course, with the variable $S_1$ it can now be ascertained whether regular or irregular combustion has taken place.

A further method is shown in FIG. 4b. In contrast to the method explained in connection with FIG. 4a, this method evaluates not the signal amplitude S but rather the integral of the signal over time, here shown as S'. To this end, the signal course S in the period from START to SYM is integrated, as illustrated by S' in FIG. 4b. If the integrator continues to run, a final value $S_2'$ results at STOP in the case of regular combustion. In case of irregular combustion, the result is a final value $S_{2k}'$ at STOP. Because of the symmetrical curve at SYM in the event of regular combustion, the value $S_2'$ is twice as large as the value $S_1'$. In the case of irregular combustion, the value $S_{2k}'$ is also correspondingly greater. A criterion for the existence or absence of irregular combustion can then be attained in a simple manner by forming a difference or a quotient.

In FIG. 5, the block circuit diagram of a first apparatus for performing a method according to the invention is shown. A sensor 10, by way of example a light, pressure or temperature sensor, is connected to a switch 11, which is actuated in accordance with the START/STOP signal and thus determines the measuring window. The measuring window is determined as a time interval, e.g. subsequent to the ignition pulse ZZP, or by the duration of the combustion flame in the combustion chamber of the ICE. The switch output leads to a first signal branch 12 and a second signal branch 13. The first signal branch includes a sample-and-hold circuit 14, which is controlled by the SYM pulse. The second signal branch 13 carries the signal, substantially unaltered, to a difference forming element or subtracting element 15, to which the output of the sample-and-hold circuit 14 is also connected. The subtracting element 15 is connected to the input of a comparator 16, which is connected to an output terminal 17. By means of the apparatus shown in FIG. 5, a method is performed such as is described above in connection with FIG. 4a. Before the SYM pulse appears, the signal S is carried via both the first branch 12 and the second branch 13 to the subtracting element 15, so that the output of of the element 15 is zero. When the SYM pulse appears, the instantaneous value $S_1$ is retained. The second branch 13 connects the subsequent signal $S_2$ or $S_{2k}$ to the following comparator 16. Comparator 16 now recognizes whether the signal appearing after the SYM pulse is greater than the retained value or not, and a recognition signal is correspondingly carried on to the terminal 17. It is naturally also possible in accordance with the invention to carry the signal, following the switch 11, via a peak-value meter, so that the duration of measurement following the appearance of the SYM pulse can be selected to be of arbitrary length.

In the apparatus shown in FIG. 6, in contrast to that shown in FIG. 5, it is not the signal amplitude but the integral over time of the signal which is monitored, as explained above with respect to FIG. 4b. To this end, the switch 11 is followed by an integrator 20, which leads to both signal branches 12, 13. In this form of embodiment, both signal branches include a sample-and-hold circuit 21 and 22, respectively. The outputs of these circuits 21, 22 are carried to a quotient former, or divider 23, which is connected to the comparator 16 with the output terminal 17. The switch 11 determines the length of the measuring window in this case as well. At the instant marked START, the integrator 20 is set at zero and it begins to integrate the signal arriving from the sensor 10. At the time marked SYM, the instantaneous value $S_{1'}$ of the integrator 18, is stored in the sample-and-hold circuit 21. At the instant marked STOP, the then instantaneous value, $S_{2'}$ or $S_{2'k}$, as the case may be, is stored in the sample-and-hold circuit 22. The values stored in sample-and-hold (S+H) circuits 22 and 21 are then divided by one another in the quotient former 23. In the case of regular combustion, the value 2 appears at the output of the circuit 23, while in the event of irregular combustion a value appears which is greater than 2; this is recognized by the comparator 16. It is naturally also possible to reset the integrator 20 to zero at the instant SYM, so that with regular combustion the quotient former 23 would produce the value 1 and with irregular combustion it would produce a value greater than 1. Instead of a quotient former 23, it is naturally also possible to use a subtracting circuit, in which case the condition for recognizing irregular combustion would be altered accordingly.

FIG. 7 shows a third embodiment of an apparatus according to the invention, which is a simplification of the apparatus shown in FIG. 6. The integrator in this case is replaced by a circuit determining relative signal values, e.g. an adder/subtracter 30, which is controlled by a clock generator 31, which furthermore controls a further switch 32 disposed before the adder/subtracter 20. In this case, the integration is performed by the addition of sequential signal values, the signal course prior to the appearance of the SYM pulse being added and the signal course following the appearance of the SYM pulse being subtracted, so that at the end of the measurement the value at the output of the adder/subtracter 30 is zero in the event of regular combustion. Naturally it is also possible to perform subtraction during the first measurement phase and to perform addition in the second, or to add the signal courses in the two measurement phases successively and store them in the meantime, then comparing the final values with one another, in a process similar to that of FIG. 6 for the signal amplitudes, or to use a forward/backward counter instead of an adder and to proceed in a corresponding manner.

In FIGS. 8a–8e, various forms of embodiment of apparatus used for generating the SYM pulse are shown.

In FIG. 8a, the SYM pulse is obtained from an ignition system 40 of the engine by means of a shift in time with respect to the instant of ignition ZZP or to the top dead center signal OT. The ignition system here has an ignition control curve unit 41 connected thereto for shifting the SYM pulse in accordance with operating conditions of the engine.

In FIG. 8b, the SYM pulse is derived from the signal S of the sensor 10 itself. The appearance of the signal maximum during a regular or normal combustion is determined with a peak-value recognition unit 42, and the position of the SYM pulse is ascertained from that.

In the apparatus shown in FIG. 8c, the location of the SYM pulse is derived from the course, or wave form of the signal S itself, derived as an average value from a plurality of combustion cycles rather than from a single signal. To this end, the peak-value unit 42 is followed by a time average-value former or circuit 43, which is triggered by a clock generator 44. The average-value former 43 forms the average value over time, i.e. the sequential combustion angles of the values characterizing the location of the SYM pulse.

In the apparatus according to FIG. 8d, the SYM pulse is derived by the method discussed above in connection with FIG. 3. The sensor 10 is followed by a comparator 45, operating as a threshold circuit, and providing an output when the switching threshold $S_o$ is passed. The values for the crankshaft angle or for the time a and b (FIG. 3 associated, respectively, with exceeding or dropping below the threshold value $S_o$ are averaged arithmetically in a subsequent level averaging circuit 46, so that the result will be the position of the SYM pulse, in time, in relation to a datum in the cycle of the ICE, for example the ignition instant ZZP, the strobing or measuring window between "start" and "stop" or top-dead-center (TDC) position, shown at OT in FIG. 1. The TDD position can, of course, be readily determined with respect to the crankshaft.

FIG. 8e shows an expanded form of the apparatus of FIG. 8d. Average value measurements over time, i.e. a number of cycles, are made, as has been explained above in connection with FIG. 8c. Time averaging circuit 43, coupled to a clock 44, averages levels a and b over a number of cycles. The output then is averaged in circuit 46. Time circuit 43 is connected to the comparator 45. The values a, b are thus first averaged, over a number of cycles, that is, over time, and only then averaged arithmetically with respect to level, see FIG. 3.

We claim:

1. Method of recognizing an irregular combustion process in an internal combustion engine (ICE) including the steps of
    deriving a combustion related signal representative of the course of the combustion of a combustion event in the engine;
    associating the combustion related signal with a predetermined angle or angular range of rotation of a crankshaft of the engine,
    and comprising, in accordance with the invention, the steps of
    analyzing the wave form of the combustion related signal with respect to symmetry about a maximum value of the combustion related signal;
    and providing an output signal representative of irregular combustion process if the wave form of the combustion related signal does not have a symmetrical relationship with respect to the maximum value thereof.

2. Method according to claim 1, including the step of determining the occurrence of the maximum value of the combustion related signal based on elapse of a predetermined time period after occurrence of an ignition pulse (ZZP) derived from an ignition system of the engine.

3. Method according to claim 1, including the step of repeatedly analyzing the wave forms of sequential combustion related signals;
    and determining the time instant of occurrence of the maximum value as a function of the average of individually determined maximum signals.

4. Method according to claim 1, wherein the step of analyzing the wave form of the combustion related signal comprises determining, with respect to an angular position of the crankshaft of the engine, and forming a reference datum, the time of occurrence of passing of the wave in increasing and decreasing direction about a threshold level;
    and averaging the time of passing in increasing and decreasing direction, with respect to said datum.

5. Method according to claim 1, wherein the step of analyzing the wave form of the combustion related signal comprises analyzing the amplitude wave shape of the combustion related signal.

6. Method according to claim 1, wherein the step of analyzing the wave form of the combustion related signal comprises integrating the combustion related signal;
    and analyzing the change in integrated value with respect to an angular position of the crankshaft of the engine and forming a reference datum.

7. Method according to claim 1, including the step of generating a strobing or measuring window related to a predetermined angular range of rotation of the crankshaft of the engine;
    and the step of analyzing the wave form of the combustion related signal comprises analyzing said signal only during said measuring or strobing window.

8. Method according to claim 7, wherein the duration of the measuring or strobing window is determined as the average value of time duration of occurrence of combustion related signals during a plurality of successive combustion related signals.

9. Method according to claim 7, further including the steps of generating window "start" and "stop" pulses, the interval between the "start" pulse and the "stop" pulse defining said measuring or strobing window;
    and including the step of time-shifting the occurrence of the "start" pulse with respect to the occurrence of an ignition pulse in the engine.

10. Method according to claim 1, further including the steps of generating window "start" and "stop" pulses, the interval between the "start" pulse and the "stop" pulse defining said measuring or strobing window;
    and including the step of generating the "start" pulse as a function of beginning of flaming of a combustible mixture in a combustion chamber of the engine, and generating the "stop" pulse upon termination of the flame of combustion within the combustion chamber.

11. Apparatus for recognizing an irregular combustion process in an internal combustion engine (ICE) having
    a sensor (10) providing an electrical output signal having a wave form representative of the course of combustion during the combustion process, or during a combustion event occurring in the engine, comprising, in accordance with the invention,
    a wave form analysis network (12, 13, 14, 15; 20, 21, 22; 30, 31) connected to receive the output signal from the sensor, and analyzing the wave form of the output signal with respect to symmetry of a first portion ($S_1$) of the wave form in relation to a second portion ($S_2$, $S_{2'}$, $S_{2k'}$) of the wave form;
    a comparator (16) connected to the wave form analysis network and determining if the first and second portions have a symmetrical relationship, said comparator providing an output signal representative of irregular combustion if the wave form portions delivered from the sensor do not have a symmetrical relationship with respect to each other.

12. Apparatus according to claim 11, including means (40, 41) for determining a time instant at which the first and second portions should have a symmetrical relationship with respect to each other, said time instant determining means providing a "symmetrical" (SYM) pulse to the wave form analysis network upon occurrence of a predetermined angular position of the crankshaft of the engine.

13. Apparatus according to claim 12, wherein said predetermined angular position of the crankshaft is top-dead-center (TDC) position.

14. Apparatus according to claim 11, including means (42) for determining the time instant at which the first and second portions of the wave form have a symmetrical relationship comprising a peak detector (42) responsive to the peak amplitude of the combustion related signal occurring during a regular combustion process, and generating a "symmetry" pulse (SYM).

15. Apparatus according to claim 14, further including an averaging circuit (43) connected to the peak-value recognition circuit (42) and averaging a plurality of peak values to derive the "symmetry" (SYM) pulse based on the average time of occurrence of the peak value in a predetermined number of output signals derived from regular combustion processes.

16. Apparatus according to claim 11, including means (45, 46) for determining the time instant at which the first and second portions of the wave form should have the symmetrical relationship, comprising a comparator (45) connected to the sensor, the comparator providing a threshold output signal when the combustion related output signal from the sensor passes the threshold level ($S_o$);

and a level averaging circuit (46) is provided, calculating the average time, after a predetermined angular position of the crankshaft of the engine, of passage of the signal, in increasing and decreasing direction, through the threshold, and providing a "symmetry" pulse (SYM) based on the arithmetic mean or average of the time when the combustion related output signal has passed said threshold level.

17. Apparatus according to claim 16, including a combustion event averaging circuit (43) connected to the time or level averaging circuit, and averaging the time of occurrence of the "symmetry" (SYM) pulse with respect to a plurality of sequentially occurring combustion related output signals from the sensor (10).

18. Apparatus according to claim 11, including means for determining the time instant at which the first and second portions of the wave form should have a symmetrical relationship with respect to each other, said means generating a "symmetry" (SYM) pulse at a time related to an angular position of the crankshaft of the engine, and forming a reference datum.

19. Apparatus according to claim 18, including engine operating determining means (41) coupled to receive the "symmetry" (SYM) pulse and shifting the pulse in dependence on an engine operating parameter.

20. Apparatus according to claim 18, wherein the wave form analysis network comprises first and second signal branches (12, 13) connected to receive the combustion related output signal from the sensor (13), the first signal branch (12) including a sample-and-hold circuit connected to and controlled by the symmetry (SYM) pulse;

the comparator being connected to both said signal branches and comparing if the signal transmitted by the second signal branch has decayed during the second portion of the wave form with respect to the signal in the sample-and-hold circuit to thereby determine if symmetry of the signal with respect to the value in the sample-and-hold circuit, stored at the time of occurrence of the "symmetry" (SYM) pulse pertains.

21. Apparatus according to claim 18, wherein the wave form analysis network comprises first and second signal branches (12, 13);

an integrator (20) connected between the sensor (10) and said first and second branches, and integrating the combustion related output signal from the sensor, the integrator integrating the signal derived from the sensor;

first and second sample-and-hold circuits (21, 22) included in said first and second branches, one of said branches being connected to and controlled by the "symmetry" (SYM) pulse and sampling and holding the value of the integrated signal at the time of occurrence of the "symmetry" pulse, the other sample-and-hold circuit (22) continuing to integrate;

and wherein the comparator (16) includes means (23) for relating the value stored in the sample-and-hold circuits to determine if the values stored in the sample-and-hold circuits have a predetermined relationship to each other representative of symmetry of the first and second portions of the wave form.

22. Apparatus according to claim 21, wherein the comparator includes at least one of: a divider circuit; a difference forming circuit, connected to receive the output from the two sample-and-hold circuits, respectively, to determine the respective relationships of the values in the respective sample-and-hold circuits (21, 22).

23. Apparatus according to claim 18, wherein the wave form analysis network comprises a clock generator (31) and a relative relation forming circuit (30) connected to the clock generator and receiving, separately, an input, under control of the clock generator, from the sensor of the first portion of the output signal and, separately, the second portion of the output signal, and the comparator (16) is connected to the relative relation forming circuit and comprises the relative relationship of the signals forming the first and second portion, said relative relation forming circuit being connected to receive the "symmetry" (SYM) pulse to switch over between the first and second portions of the signal.

24. Apparatus according to claim 11, further including switching means (11) connected to define a measuring or strobing window, and transmitting the combustion related output signal from the sensor (10) to the wave form analysis network only during occurrence of a limited time period defining said measuring or strobing window.

25. Apparatus according to claim 11, wherein the wave form analysis network includes a peak detector (42), said first and second portions being determined with reference to a rising wave form in advance of the peak determined by the peak detector, and the wave form subsequent to determination of the peak by the peak detector.

* * * * *

UNITED STATES PATENT AND TRADEMARK OFFICE
CERTIFICATE OF CORRECTION

PATENT NO. : 4,503,505

DATED : March 5, 1985

INVENTOR(S) : Eckard DAMSON et al

It is certified that error appears in the above-identified patent and that said Letters Patent is hereby corrected as shown below:

Claim 10, column 8, line 17, change "claim 1" to --claim 7--

Column 1, line 26, change "instant fuel of injection" to --instant of fuel injection--.

Signed and Sealed this

Third Day of September 1985

[SEAL]

Attest:

DONALD J. QUIGG

*Attesting Officer*     *Acting Commissioner of Patents and Trademarks - Designate*